No. 850,754. PATENTED APR. 16, 1907.
J. W. HILL.
WHEEL.
APPLICATION FILED SEPT. 10, 1906.

WITNESSES.
Hazel B. Hiett
Lowell Schreiber

INVENTOR.
John W. Hill,
By Owen & Owen,
his attorneys.

UNITED STATES PATENT OFFICE.

JOHN W. HILL, OF MONCLOVA, OHIO, ASSIGNOR OF ONE-FIFTH TO S. J. ECKENRODE, OF MAUMEE, OHIO, ONE-FIFTH TO B. S. STAPLETON, OF CLEVELAND, OHIO, ONE-FIFTH TO C. E. BARTENBACK, AND ONE-FIFTH TO E. L. JOHNSON, OF TOLEDO, OHIO.

WHEEL.

No. 850,754.     Specification of Letters Patent.     Patented April 16, 1907.

Application filed September 10, 1906. Serial No. 334,046.

*To all whom it may concern:*

Be it known that I, JOHN W. HILL, a citizen of the United States, and a resident of Monclova, in the county of Lucas and State of Ohio, have invented a certain new and useful Wheel; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to vehicle-wheels, and is particularly designed for use on automobiles or the like, but may be used in connection with all other classes of vehicles to which it might be adapted or appropriate.

The object of my invention is the provision of a vehicle-wheel of improved resilient construction whereby it is adapted to absorb both the jar or jerking action incident to the sudden starting or stopping of the vehicle and the jar or vibration occasioned by the running of the vehicle over rough or uneven surfaces.

A further object of my invention is the provision of a wheel the hub of which and the weight of the vehicle are resiliently suspended from the rim thereof instead of being supported thereby, as is usual with wheels of the type having spring-spokes.

The operation, construction, and arrangement of the parts of my invention are fully described in the following specification and one embodiment thereof illustrated in the accompanying drawings, in which—

Figure 1:
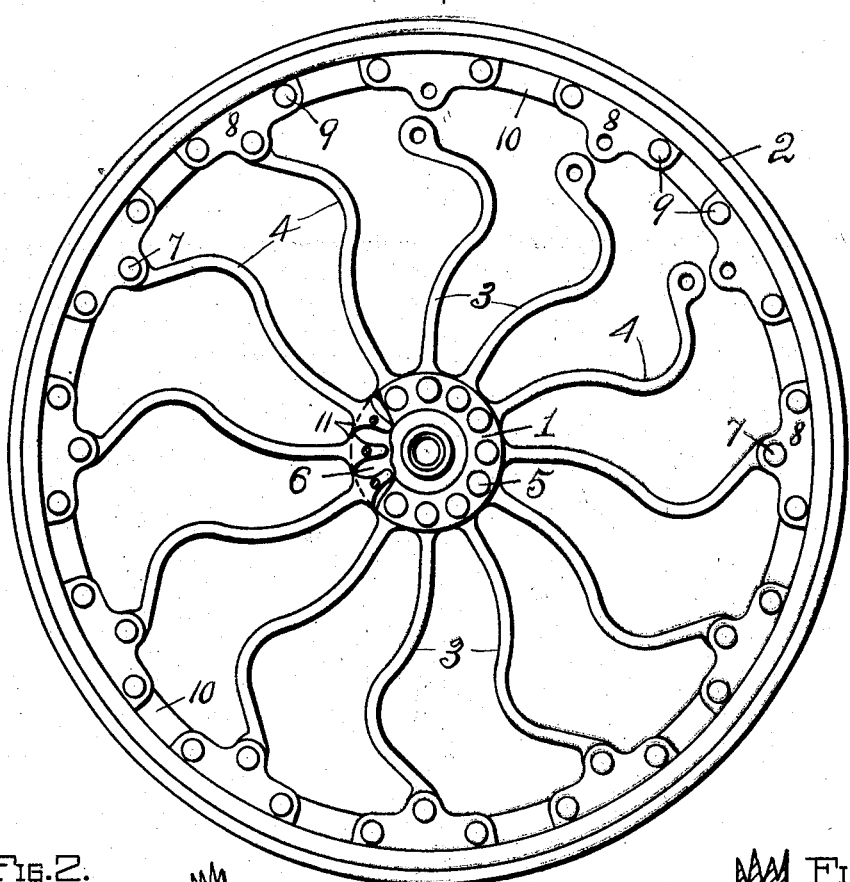
Figure 2:
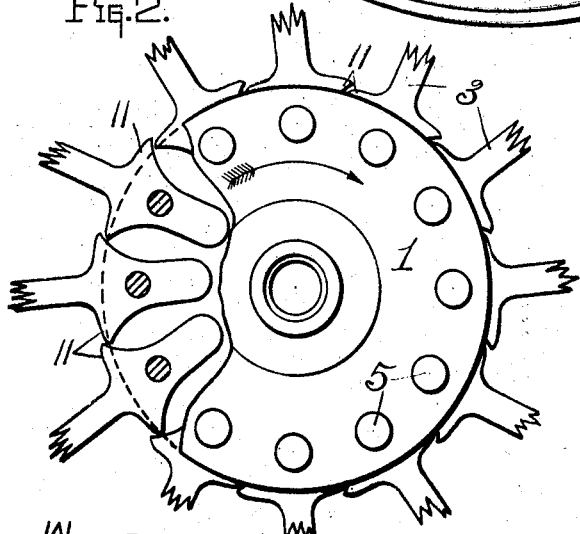
Figure 3:
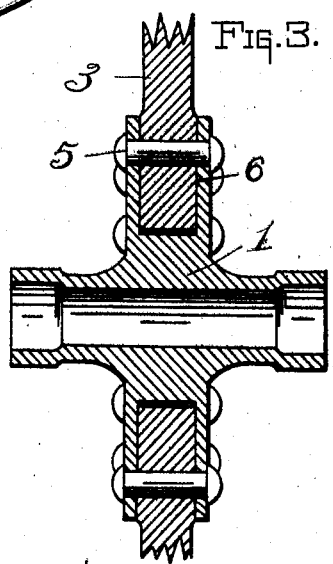

Figure 1 is a side elevation of a wheel embodying my invention, with a portion of the hub broken away and three of the spokes released from the rim. Fig. 2 is a similar enlarged view of the hub, illustrating the action of the spokes relative to each other and the hub when a sudden stress is applied to the latter in the direction of the arrow; and Fig. 3 is a cross-section of Fig. 2.

Referring to the drawings, 1 designates the hub, which may be of any suitable construction, 2 the rim, which may either be provided with a metal tread or shaped to adapt it to receive a pneumatic or other kind of tire, as may be desired, and 3 the spokes of a wheel comprising my invention.

The spokes 3 are formed of spring metal and bowed, as at 4, or otherwise suitably bent or formed to adapt them to be longitudinally resilient under stress. These spokes have their inner ends pivotally secured by bolts or headed pins 5 within the annularly-channeled or spoke-receiving portion 6 of the hub and their outer ends pivotally secured by pins or rivets 7 to plates 8 in direct radial alinement with the points of securance of their inner ends to the hub, said plates 8 being attached by bolts or rivets 9 to the inner annular flange 10 of the rim, or the spokes may be attached to the rim in any other suitable manner. The normal length of the spoke when free from stress is such that when their inner ends are secured to the hub their outer ends fall short of the points to which they are intended to be secured, as shown in Fig. 1, thus requiring the application of tensile stress thereto to lengthen them against their tension sufficiently to enable such outer ends to be attached to the rim 2.

The spokes 3 have their inner ends set a sufficient distance within the hub to give it the desired lateral strength and are formed adjacent such ends with the oppositely-projecting shoulders 11, each of which is adapted to abut the contiguous shoulder of the next spoke when the spokes are in normal position relative to the hub, as shown in Fig. 1. In order to render possible a slight rotary movement of the hub relative to the spokes and connected rim, the shoulders 11 terminate substantially in points, and each has its inner side shaped to describe the arc of a circle having the pivot 5 of the contiguous spoke as its axis, or substantially so, thus adapting one shoulder of each spoke to pass under the contiguous shoulder of the next succeeding spoke as they are oscillated in the same direction in unison as a sudden stress is applied to the hub in the opposite direction, as illustrated in Fig. 2. While this construction of the spoke ends is preferable, I wish it understood that I do not restrict myself to its use, as its purpose is only to close the space between the spokes at the rim of the hub.

With this construction of wheel it is apparent that each spoke has a tendency to draw the rim toward the hub, thus causing the hub and the weight carried thereby to be resiliently suspended from the upper portion of the rim, while the tension on the lower spokes is released proportional to the increase of the tension on the opposite spokes. This is also the case when the wheel strikes an obstruction in its path of movement, as the jar which would otherwise be communicated to the contiguous portion of the hub is transferred thereto in a much reduced form from the opposite portion of the rim, the spokes on such side lengthening to impart a resilient cushioning effect to the hub. It is also apparent with this construction of wheel that the disagreeable jerking of a vehicle due to a sudden starting or stopping thereof is almost entirely eliminated, as the manner of mounting the spokes permits the hub to have a resilient turning movement relative to the wheel-rim proportional to the stress applied or resistance encountered, thus causing the starting or stopping to lose its abruptness or violence on the spokes before being communicated to the hub and vehicle carried thereby. It would be impossible to obtain this action of the wheel were it not for the fact that the hub and rim exert a tensile stress upon the spokes, thus tending to resist any rotary movement of one of said parts relative to the other.

It has been found with my construction of wheel that not only the jar and vibration incident to the running of vehicles over rough or uneven surfaces, but also the jerking ordinarily communicated to a vehicle by a sudden starting or stopping thereof, are reduced to a minimum and that a wheel equipped with a metal tread will run as smoothly and free from jar as the ordinary wheel equipped with a pneumatic tire.

Having thus described my invention, what I claim as new, and desire to secure by Letters Patent, is—

1. A wheel having spring-metal spokes each pivotally attached to the hub and rim at radially-alining points and bowed in the plane of the rim adjacent their outer ends.

2. A wheel having curved spring-spokes applied thereto under an initial tension and having their opposite ends pivotally attached in direct radial alinement to the hub and rim.

3. A wheel having its spokes longitudinally resilient and pivoted at their ends in direct radial alinement to the rim and hub to permit a resilient rotary movement of the hub in either direction relative to the rim.

4. A wheel having curved spring-metal spokes the ends of which are pivoted in radial alinement to the hub and rim and having their hub ends formed contiguous to the hub periphery with opposite shoulders which normally abut the shoulders of the spoke, but turn past each other when the hub has a turning movement in either direction relative to the rim.

5. A wheel having bowed spring-metal spokes pivoted to the rim and hub and normally maintained in an expanded state thereby, and having their hub ends formed with shoulders which normally abut, but turn past each other when the hub has a turning movement relative to the rim.

6. A wheel having its hub peripherally channeled and spring-metal spokes having their inner ends mounted in contiguous position within such channel and pivoted to the hub and their outer ends pivoted to the rim in radial alinement with their inner ends, said spokes being bowed intermediate their ends.

In testimony whereof I have hereunto signed my name to this specification in the presence of two subscribing witnesses.

JOHN W. HILL.

Witnesses:
E. L. JOHNSON,
C. W. CLEMM.